Figure 1:
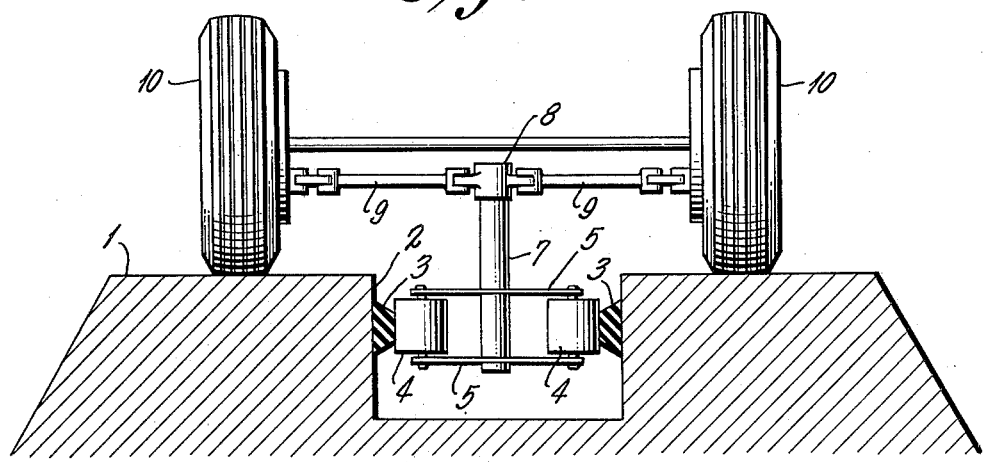

Feb. 12, 1963 S. VITTORELLI 3,077,165
VEHICLE GUIDE MEANS
Filed April 7, 1960

INVENTOR
Sergio Vittorelli
BY Stevens, Davis, Miller & Mosher
ATTORNEYS

United States Patent Office 3,077,165
Patented Feb. 12, 1963

3,077,165
VEHICLE GUIDE MEANS
Sergio Vittorelli, Monza, Italy, assignor to
Pirelli S.p.A., Milan, Italy
Filed Apr. 7, 1960, Ser. No. 20,740
Claims priority, application Italy Apr. 11, 1959
5 Claims. (Cl. 104—247)

The present invention relates to a guiding wall system for roads to be run by vehicles having at least a pair of steerable wheels and automatically guided.

Road systems allowing the automatic guidance of vehicles or of vehicle trains running on them are already known, in which the guiding element is a large longitudinal projecting ridge against which roll the rollers or the small wheels connected to the steering members of the wheels below the vehicle frame.

These rollers or small wheels, which by means of suitable devices are compelled to remain in contact with the ridge provided on the road, guide the wheels according to the path of the road itself, so that the vehicle runs on it without the need of a driver.

The longitudinal ridge can be, for instance, constituted by a concrete slab whose edges can be formed by beams of wood, iron or concrete.

These known systems, which have proved satisfactory with respect to the transmission to the wheels of a path of movement corresponding to the path of the road, have however shown some working drawbacks, chiefly due to the total rigidity of the guiding walls which are not able to absorb the shocks which are unavoidably exerted on them by the rollers or by the small wheels, in particular when the vehicle is running on curves.

The present invention aims at providing a guiding wall system able to ensure the contact between the rollers and the guiding walls without generating vibrations, which are harmful to the life of the vehicle and uncomfortable for those riding in the vehicle.

The object of the present invention is therefore a system of vertical guiding walls for road, covered by rubber strips of suitable height, against which roll metallic rollers on vertical axes connected to the wheel steering members.

The rubber covered guiding walls can be the vertical edges of a central longitudinal ridge or the walls of a longitudinal trench formed in the roadway.

The height of the rubber strips covering the guiding walls varies along the path of the road in accordance with the stresses imparted to them by the rollers and is greater where these stresses are higher, as for instance on the curves. The height of the rollers, however, is always greater than that of the rubber strips, in order to ensure their contact with the latter also when, in consequence of the load or of the deflation of one or more tires of the vehicle, the position of the rollers is lower than usual.

From a theoretical point of view the aim of the invention could be achieved also by using rubberized rollers rolling on metallic guiding wheels. However, in practice, this solution cannot be adopted as a simple rubber cover would not have a sufficient life whilst, to provide the rollers with tires, these should have such a diameter as to make their use very difficult in an arrangement such as that described in the present invention.

Figure 2:
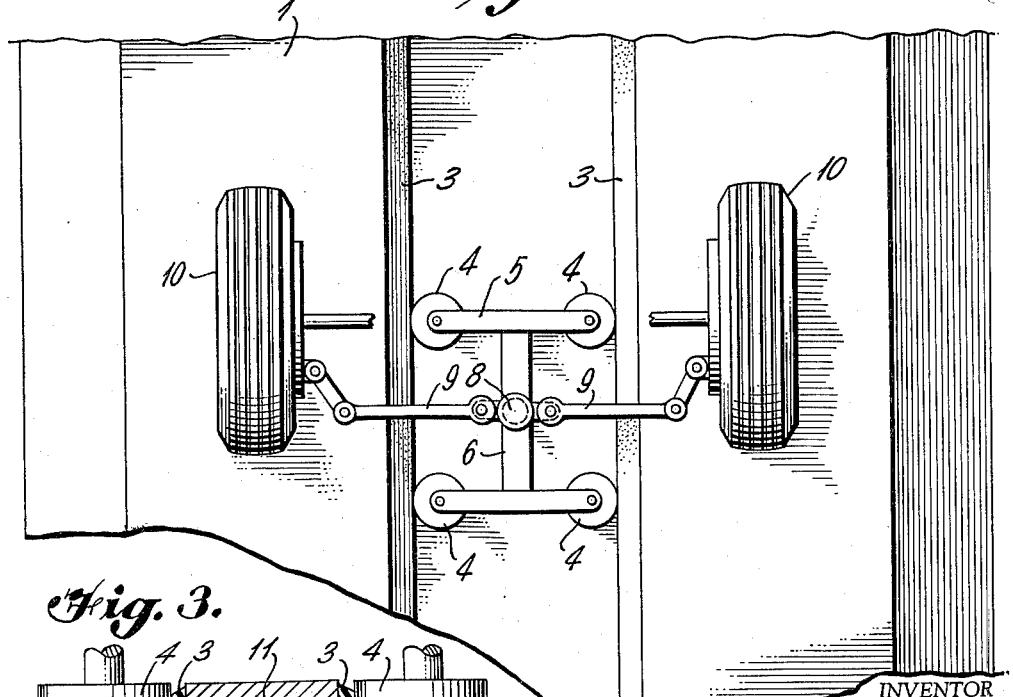
Figure 3:
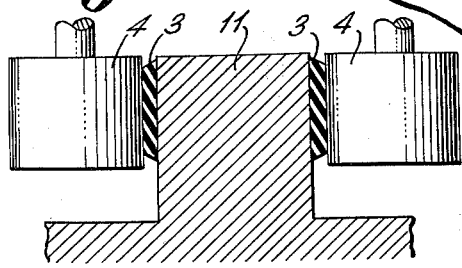

The invention will now be better illustrated with reference to the attached drawings, given by way of non-limiting example, in which:

FIGURE 1 represents a schematic cross section of the road provided with guiding walls in accordance with the invention and run by a vehicle partially represented in front view, FIGURE 2 represents the road of FIGURE 1 in schematic plan view; and FIGURE 3 is a fragmentary schematic cross section of a modified form of the invention, this figure being on an enlarged scale and showing the strips on the walls of a longitudinal ridge.

In the figures the corresponding parts are indicated with the same reference numerals.

A trench 2, directed along the road axis, is formed in the roadway 1 on which the vehicle runs, and two rubber strips 3, uninterruptedly extending for the whole length of said trench, are fastened to the vertical walls of the trench. The strips 3 serve as rolling surfaces for four metal rollers 4, which are connected to one another by means of the cross bars 5 and 6 in order to form a deformable quadrilateral.

The center of the cross bar 6, through the rod 7, is secured to the articulated joint 8, from which start the tie rods 9 for the steerage of the vehicle wheels 10 in accordance with the path of the road.

As said above, the rubber strips 3, instead of being secured to the walls of a trench, can be fastened to the edges of a continuous longitudinal ridge 11 running between the wheels of the vehicle. Moreover the strips can be fixed to longitudinal elements (for instance beams of wood, iron or concrete) suitably connected to the walls of the trench or to the edges of the ridge.

It is moreover understood that the strips 3 can be made of any suitable material having elastic properties equivalent to those of the rubber.

I claim:

1. In a vehicle guidance system for roads to be travelled by vehicles having at least one pair of steerable wheels wherein there is provided a wheel steering means connected to said steerable wheels, vertical guiding walls extending along said road and corresponding to the path of said road and rollers rotatable on vertical axes and mounted on said wheel steering means and bearing against said vertical guiding walls so as to steer said vehicle along the path of said road, the improvement which comprises continuous strips of a material having the elastic properties of rubber on said guiding walls.

2. The improvement as set forth in claim 1 wherein the height of the strips on the guiding walls varies along the path of the road in accordance with the stresses imparted to the strips by the rollers, said height being greater where the stresses are higher.

3. The improvement as set forth in claim 2 wherein the height of the rollers is greater than that of the strips on the guiding walls.

4. The improvement as set forth in claim 1 wherein the height of the rollers is greater than that of the strips on the guiding walls.

5. The improvement as set forth in claim 1 wherein the rollers are metallic.

References Cited in the file of this patent
UNITED STATES PATENTS

| | | |
|---|---|---|
| 2,101,024 | Heinze | Dec. 7, 1937 |
| 2,468,158 | Bartholowmew | Apr. 26, 1949 |
| 2,503,120 | Meyer | Apr. 4, 1950 |
| 2,718,194 | Ruhlmann | Sept. 20, 1955 |